(12) United States Patent
Lanter et al.

(10) Patent No.: US 9,066,532 B2
(45) Date of Patent: Jun. 30, 2015

(54) SOFT MOIST EXTRUDED ANIMAL FEED

(75) Inventors: Kent J. Lanter, Waterloo, IL (US);
Brenda de Rodas, O'Fallon, MO (US);
Randel H. Raub, Bunker Hill, IL (US);
Mary Elizabeth Gordon, Wappingers Falls, NY (US)

(73) Assignee: Purina Animal Nutrition LLC, Shoreview, MN (US)

( * ) Notice: Subject to any disclaimer, the term of this patent is extended or adjusted under 35 U.S.C. 154(b) by 1551 days.

(21) Appl. No.: 12/273,759

(22) Filed: Nov. 19, 2008

(65) Prior Publication Data
US 2010/0124582 A1    May 20, 2010

(51) Int. Cl.
| A23K 1/00 | (2006.01) |
| C11B 5/00 | (2006.01) |
| A23P 1/12 | (2006.01) |
| A23K 1/18 | (2006.01) |
| A23D 9/00 | (2006.01) |
| A23K 1/16 | (2006.01) |
| A23N 17/00 | (2006.01) |

(52) U.S. Cl.
CPC ........... *A23K 1/1813* (2013.01); *A23D 9/00* (2013.01); *A23K 1/003* (2013.01); *A23K 1/1609* (2013.01); *A23K 1/1806* (2013.01); *A23K 1/184* (2013.01); *A23N 17/005* (2013.01)

(58) Field of Classification Search
USPC ................................. 426/516, 654, 807, 805
IPC ................ A23K 1/1813,1/003, 1/1609, 1/1806, A23K 1/184; A23D 9/00; A23N 17/005
See application file for complete search history.

(56) References Cited

U.S. PATENT DOCUMENTS

| 2,385,068 | A | * | 9/1945 | Eshbaugh et al. | 426/452 |
| 3,496,858 | A | * | 2/1970 | Jenkins | 426/634 |
| 3,852,483 | A | * | 12/1974 | Oborsh et al. | 426/94 |
| 3,908,025 | A | * | 9/1975 | Miller et al. | 426/623 |
| 3,985,904 | A | * | 10/1976 | Bernotavicz | 426/332 |
| 4,158,706 | A | * | 6/1979 | Ernst et al. | 426/327 |
| 4,190,679 | A | * | 2/1980 | Coffee et al. | 426/623 |
| 4,191,783 | A | * | 3/1980 | Burkwall et al. | 426/335 |
| 4,410,551 | A | * | 10/1983 | Comer | 426/99 |
| 4,418,086 | A | * | 11/1983 | Marino et al. | 426/302 |
| 4,777,058 | A | * | 10/1988 | Chandler et al. | 426/448 |
| 4,904,494 | A | * | 2/1990 | Spanier | 426/646 |
| 5,120,565 | A | * | 6/1992 | Lanter et al. | 426/623 |
| 5,217,740 | A | | 6/1993 | Lanter | |
| 5,300,312 | A | * | 4/1994 | Lusas et al. | 426/634 |
| 5,683,739 | A | | 11/1997 | Lanter et al. | |
| 5,871,802 | A | | 2/1999 | Gao et al. | |
| 7,223,436 | B2 | | 5/2007 | Freeman | |

FOREIGN PATENT DOCUMENTS

EP        71331 A2 *   2/1983

OTHER PUBLICATIONS

Friesen et al. J. Anim. Sci. 1993, vol. 71, pp. 2099-2109.*
Moritz et al. "Just add water", Watt Poultry USA, Apr. 2001, 4 pages.*

* cited by examiner

*Primary Examiner* — Chhaya Sayala
(74) *Attorney, Agent, or Firm* — Dorsey & Whitney LLP; Bridget M. Hayden, Esq.

(57) ABSTRACT

The animal feed of the present invention is a soft extruded nugget with a chewy, moist interior. These nuggets have a high moisture content and preservatives. The animal feed also has a long shelf life given the high moisture content. The animal feed of this invention is provided to young animals after weaning from a liquid diet.

24 Claims, 2 Drawing Sheets

SOFT MOIST EXTRUDED ANIMAL FEED

BACKGROUND OF THE INVENTION

Weaning presents many challenges to a young animal. These challenges include an abrupt change from a liquid to a solid diet that contains ingredients that may not be easily digestible to the young animal. Immediately after weaning, the digestive system of the animal has to adapt to a new feeding regime with respect to enzyme secretion. In addition, the young animal is presented with a new social structure. Combined, these effects disrupt nutrient intake that is necessary to maintain gut integrity and function. The reduced feed and water intake after weaning may contribute to intestinal inflammation, which may affect the structure of the villus and crypt. These disruptions in water and feed intake affect growth performance and are further exacerbated by an immature immune system. This creates susceptibility to digestive upsets and/or diarrhea.

In general, complex pelleted diets containing plasma protein and milk products have been used with some success to minimize postweaning lag in animals. However, it is not uncommon for a young animal to experience prolonged growth retardation.

SUMMARY OF THE INVENTION

In one aspect, the present invention includes an extruded animal feed composition comprising a soft, moist nugget. The feed includes a moisture content of between about 12 and about 20 percent and preservatives of between about 0.25 and about 8.0 weight percentage.

In a further aspect, the present invention includes a method of making animal feed composition by preparing a blend comprising at least about 0.25 percent preservatives.

In yet another aspect, the present invention includes a method of feeding an animal by providing a young animal extruded animal feed, wherein the animal feed includes a soft moist nugget. The feed includes between about 0.25 percent by weight and about 8 percent by weight of preservatives and between about 12 percent and about 20 percent moisture and wherein the feed is provided at the onset of weaning.

In a further aspect, the present invention includes a method of weaning a mammal comprising feeding the young animal extruded animal feed. The feed includes between about 0.25 percent by weight and about 8.0 percent by weight of preservatives and between about 12 percent and about 20 percent moisture.

DETAILED DESCRIPTION OF ILLUSTRATIVE EMBODIMENTS

Figure 1:
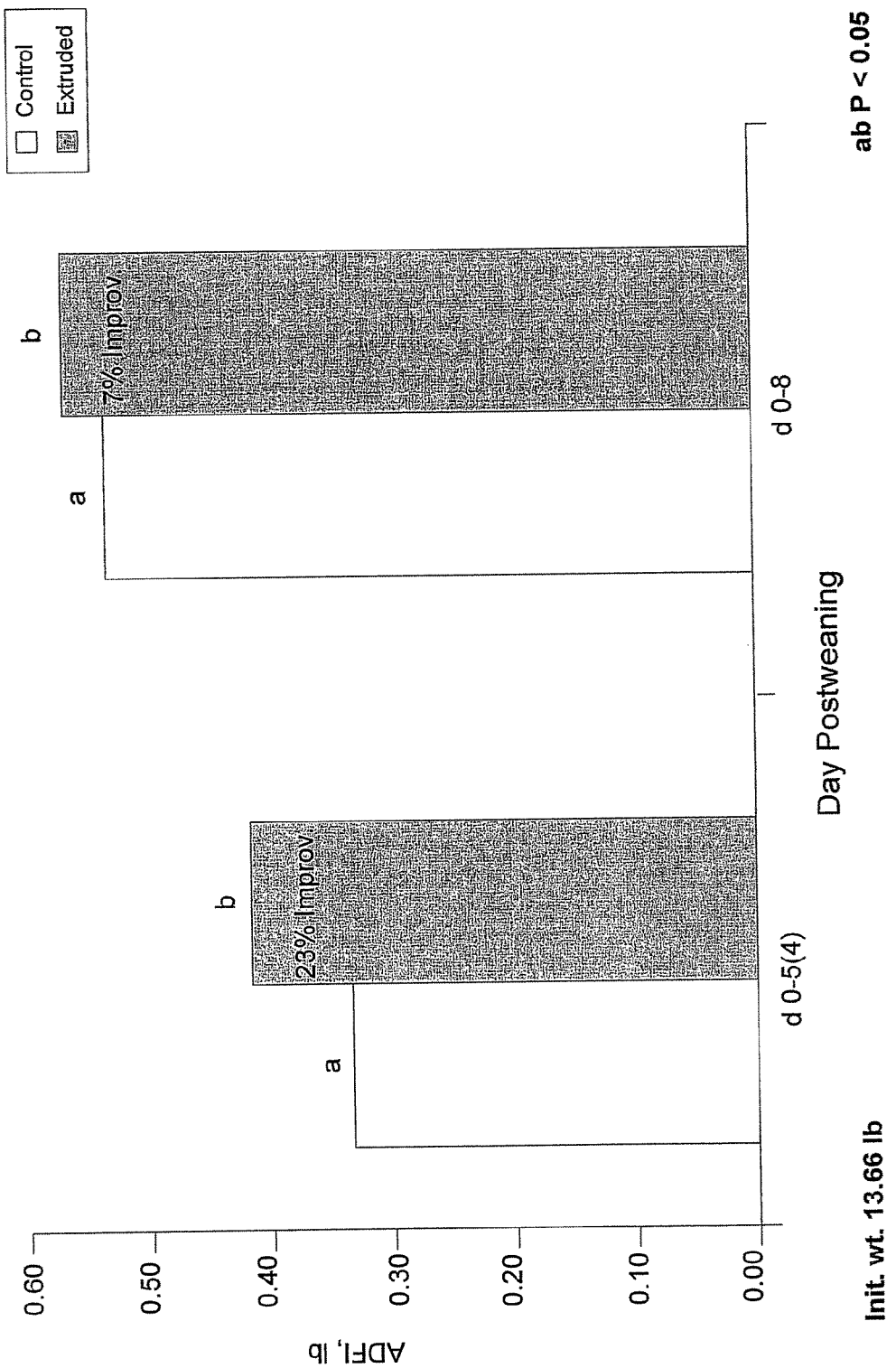
FIG. 1 is a bar graph illustrating the effect of a soft moist extruded diet on Average Daily Feed Intake of nursery pigs.

The animal feed of this invention includes a soft extruded nugget with a chewy, moist interior. The animal feed may be provided for young animals as a transitional animal feed between weaning from a liquid diet to a solid diet. Alternatively, the animal feed may also be provided for adult animals. The animal feed nuggets generally include solid food components such as starch, fat and protein, a high moisture content and preservatives that allow for the shelf stability of the animal feed even at the high moisture content.

The animal feed of the present invention includes extruded nuggets that advantageously feel like the typical extruded nuggets of a solid food diet. The animal feed, however, is pliable and includes a soft, moist interior with a chewable consistency that is in between the liquid diet and the hard pellets or nuggets typical of a solid diet. Thus, with respect to the animal, the use of this animal feed allows a young animal to adapt to the consistency of a solid food diet. With respect to the farmer or the caretaker of the animal, the animal feed is easy to provide and does not have the drawbacks of a gel based transitional diet.

The animal feed of the present invention generally includes one or more starch components. A variety of starch sources can be used and include, for example, corn, wheat, barley, oats, sorghum, tapioca, and any of their milled components. Combinations of any two or more of these may also be included. The amount of starch in the animal feed can vary and preferably is at least about 15 weight percent. More preferably, the amount of starch is between about 20 and about 50 weight percent.

The animal feed of the present invention can also include added fat. As used herein, added fat includes liquid and soluble materials comprising edible mono-, di and triglycerides of fatty acids and free fatty acids which are not inherently present in the starch source (or any other nonfat sources that may be present, e.g. the indigenous fat present in meat meal, fish meal, oleaginous seed, etc.). Added fat includes both animal fat, e.g. bleachable fancy tallow, beef tallow, choice white grease, yellow grease, etc; vegetable oil, e.g. soybean oil, palm oil, cottonseed oil, sunflower oil, etc.; and combinations of any of these. The amount of added fat in the nugget is generally at least about 0.5 weight percent.

The animal feed of the present invention may also include protein. A variety of sources of protein can be used and preferably include, for example, soybean, cottonseed and corn gluten meal. Additional exemplary protein sources include plasma protein, egg protein and meal protein. Animal by-product meals such as meat meal, poultry meal, blood meal, feather meal and fish meal may also be included. Plant by-product meals such as wheat middlings, soybean hulls and corn by-products may also be included. Microbial proteins such as torula yeast and brewer's yeast may also be used. The amount of protein in the nugget is generally at least about 8 weight percent, preferably at least about 25 weight percent.

The animal feed of the present invention also advantageously includes one or more preservatives. Preservatives are particularly included due to the high moisture content found in the animal feed. The high moisture content provides a more favorable environment for growth of microbes. Preservatives preferably include, but are not limited to, citric acid, propionic acid, fumaric acid, and potassium sorbate. The use of other commonly known preservatives is also within the scope of this invention. Generally, the preservatives in the animal feed are sufficient to minimize the number of microbes in the animal feed. Preferably, the total amount of preservatives in the animal feed are between about 0.25 weight percent and about 8 weight percent. More preferably, the preservatives in the animal feed are between about 2 percent and 5 percent by weight.

The animal feed of the present invention has a long shelf life. The shelf life of the animal feed of the present invention is at least 3 months. Preferably, the shelf life of the animal feed is at least 6 months and more preferably, at least a year.

The moisture content of the animal feed can be measured by any of the known techniques in the art and is generally between about 11 and about 24 weight percent. Preferably, the moisture content of the animal feed is between about 12 percent and about 20 percent.

A number of additional ingredients may be present in the animal feed of the present invention. These include flavorings, coloring and dye ingredients, vitamins and minerals, and various processing aids such as glycerol monostearate.

The animal feed nugget of this invention generally has a pH of about 8 or below. Preferably, the pH of the animal feed is between about 3.0 and about 6.6. More preferably, the pH of the animal feed is about 5.5.

The present invention includes a method of making animal feed nuggets. The nuggets are formed through the use of conventional extrusion devices, such as that described in U.S. Pat. No. 3,496,858. Typically, the dry ingredients are first blended in a dry mixer (e.g. Hobart mixer or ribbon mixer) to form a relatively homogeneous mixture and then ground by any suitable means (e.g. Hammermill grinder). This ground mixture is fed to the extruder, typically through the conditioner. The extruder may operate at a temperature of at least about 100° C. and this temperature in combination with the pressure caused by the action of the rotating screw on the mixture and the friction between the flowing mixture and the component parts of the extruder result in a pressure within the extruder typically in excess of 20 psi, preferably in excess of 90 psi. The mixture is mechanically worked by the rotating screw until it eventually flows in a generally fluid manner.

Steam may be added to the extruder to increase the temperature of the material and/or to raise the moisture content of the mixture. Steam that is added at the conditioner may be at a temperature in excess of 100° C. Steam added at the barrel may be above 100° C. The steam is typically added at the conditioner of the extruder. In some embodiments, it may also be added at the barrel.

The amount of heat and steam applied to the mixture is controlled by known valving techniques in a manner to obtain temperatures which are sufficiently high to cause the desired chemical and physical reactions within the mixture. The amount of heat and steam actually added to a given mixture will vary with the nature and ratio of components and the other operating parameters of the extruder, e.g. pressure, residence time of the mixture, etc. In preferred embodiments, the extrusion mixture is between about 100° C. and about 150° C.

After the mixture has been sufficiently blended and cooked, it is forced from the extruder by the rotating screw or screws through a restricted orifice. Since the mixture emerges from an environment of high temperature and pressure into an environment of lower temperature and pressure (typically ambient temperature and pressure), the mixture expands upon leaving the extruder. This results in a cooling of the mixture and a partial loss of its water content (in the form of steam). The mixture leaves the extruder in an extended ribbon which is cut by any conventional cutting means. The extrudate can be dried by any conventional means to achieve the desired moisture content.

The size of the extruded feed can vary and is preferably less than about 5/16 inches in diameter. More preferably, the diameter of the extruded feed is between about 2/32 inch and about 8/32 inch. In embodiments of feeding nursery pigs, feed diameters of between about 3/32 inch and about 6/32 inch may be preferable. In embodiments where the animal feed is for large animals, i.e. a horse, larger diameter feed may be preferable.

The present invention includes a method of feeding an animal. The animals are preferably livestock. The animals can be ruminants such as cows and sheep. Alternatively, the animals can also be pigs. Nursery pigs or weanling pigs, for example, advantageously benefit from being fed the animal feed described herein. The young animal can be provided with the animal feed upon weaning from a liquid diet but prior to being administered the hard pellets or nuggets that are typically provided. The animals, in some embodiments, may also be horses.

Figure 2:
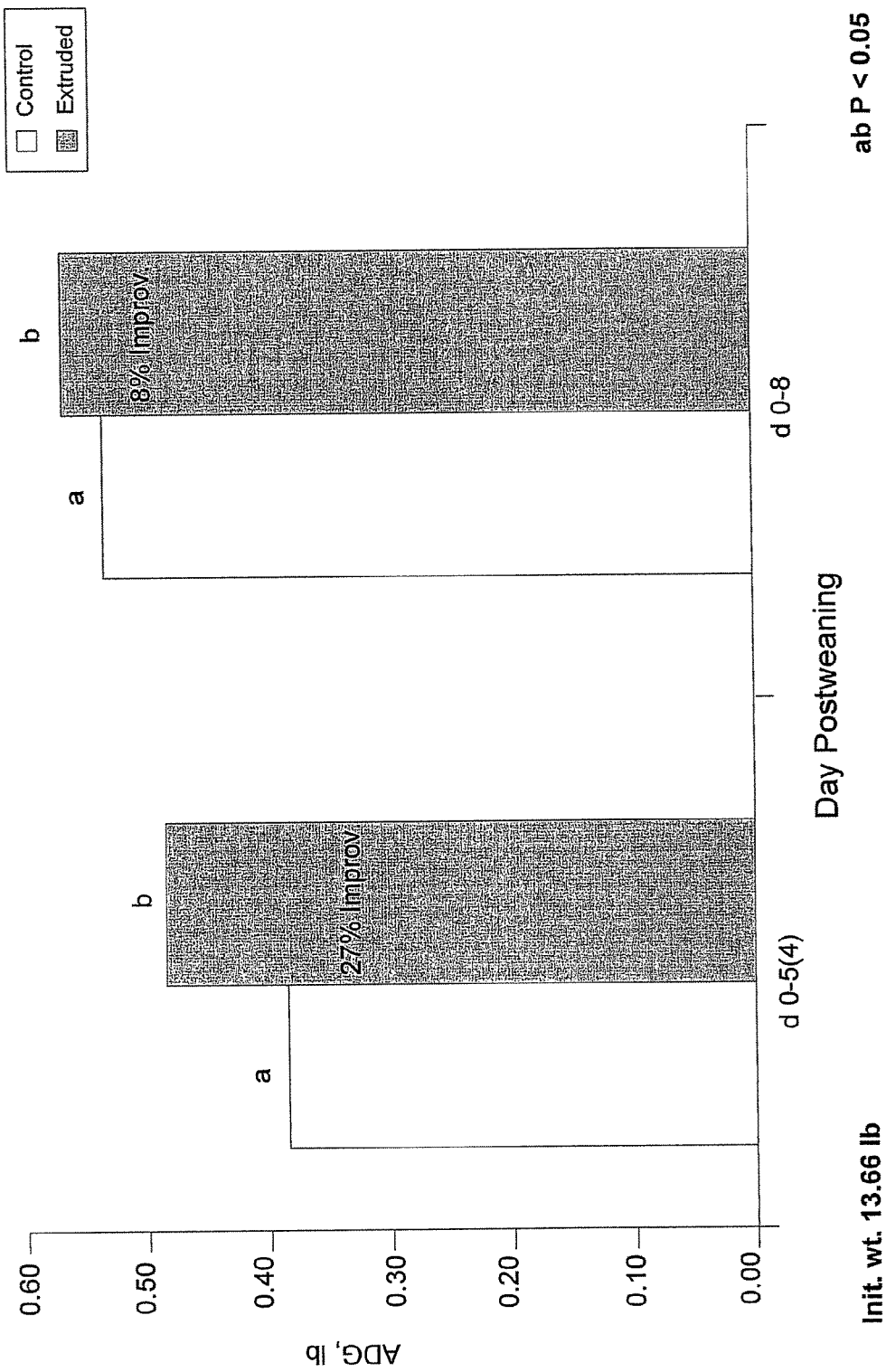
FIG. 2 is a bar graph illustrating the effect of a soft moist extruded diet on Average Daily Gain of nursery pigs.

The palatability and texture of the animal feed is beneficial to the young animal and diminishes the growth lag typically seen when young animals are weaned from a liquid diet to a solid diet. FIG. 1 shows the results of 4 trials in which there were 44 pens with 4 or 5 pigs present in each pen. The average daily feed intake (ADFI) of the pigs was calculated and FIG. 1 shows that there was a 23% improvement in the amount of feed intake at days 0-5 and a 7% improvement over days 0-8. Similarly, FIG. 2 shows the average daily gain (ADG) of the same group as in FIG. 1. During days 0-5, there was a 27% improvement in ADG and an 8% improvement in during days 0-8. Table 1 and Table 2 show data that illustrate that nursery pigs fed the soft moist extruded diet of the present invention perform better than nursery pigs fed the control hard pellet diet. Nursery pigs were fed the soft moist extruded diet for about 8 days and common pelleted diets after day 8.

TABLE 1

|  | Treatment | | |
| --- | --- | --- | --- |
|  | Control | Extruded | SEM |
| PH 2 (day 8-15) | | | |
| ADG, lb | $0.774^b$ | $0.847^c$ | 0.01 |
| ADFI, lb | $0.930^b$ | $1.022^c$ | 0.01 |
| Feed:gain | 1.23 | 1.25 | 0.01 |
| PH 1 & 2 (day 0-15) | | | |
| ADG, lb | $0.653^b$ | $0.707^c$ | 0.015 |
| ADFI, lb | $0.717^b$ | $0.780^c$ | 0.012 |
| Feed:gain | 1.10 | 1.10 | 0.01 |
| Mort & Rem | $9^b$ | $1^c$ | |

$^a$Values are means of 44 pens of four or five pigs each
$^{bc}$Means in the same row with different superscript letter differ (P < 0.05)

TABLE 2

|  | Treatment | | |
| --- | --- | --- | --- |
| Pig Wt., lb | Control | Extruded | SEM |
| Initial | 13.66 | 13.66 | 0.01 |
| Day 5 (or 4) | $15.5^b$ | $16.0^c$ | 0.09 |
| Day 8 | $18.0^d$ | $18.3^e$ | 0.126 |
| Day 15 | $23.5^b$ | $24.3^c$ | 0.185 |
| Day 25 | 35.7 | 36.2 | 0.339 |

$^a$Values are means of 44 pens of four or five pigs each
$^{bc}$Means in the same row with different superscript differ (P < 0.05)
$^{de}$Means in the same row with different superscript differ (P < 0.10)

In preferred embodiments, weanling pigs are administered the soft, moist extruded nuggets as soon as the pigs are weaned from a liquid diet. Preferably, the pigs are administered the soft moist extruded nuggets for at least 5 days. More preferably, the pigs are administered the soft moist extruded nuggets for about 5 to about 8 days. The soft moist extruded nuggets may also be administered for longer than about 8 days.

The present invention also includes a method of weaning a young animal. Young animals at the onset of weaning can be administered the soft moist extruded nuggets of the present invention. The soft moist feed is preferably administered for between about 5-8 days. In some embodiments, the soft moist feed may be administered for greater than about 10 days. The young animals provided with the soft moist feed perform better than young animals that are provided with hard pellets after weaning. A combination of the soft, moist feed of the present invention and hard pellets may be fed to the young animals prior to transitioning from the soft, moist feed of the present invention to the standard hard pellets.

EXAMPLES

Example 1

Effect of Soft Moist Extruded Feed on Nursery Pigs

One hundred twenty weanling pigs (Monsanto EBX x Gene Packer® 35) averaging 13 lb bodyweight (BW) were used in a 36-day growth trial to evaluate the effect of feeding a soft moist extruded diet on performance of nursery pigs. At weaning, pigs were sorted by weight and divided into twelve weight groups (blocks) of ten pigs per weight group. Pigs within each weight block were allotted into two equal subgroups (pens) of five pigs per pen (12 pens per treatment). Dietary treatments were randomly assigned to pens (subgroups) within each of the weight groups (blocks). Dietary treatments used are shown in Table 3.

TABLE 3

Ration Used[a]

| | Treatment | |
|---|---|---|
| | 1<br>Control/pelleted -<br>sugar coated | 2<br>Soft Moist<br>Extruded |
| Phase 1, day 0-5 | A1 | D1 |
| Phase 1, day 5-8 | A1 | D1 |
| Phase 2, day 8-15 | U300-A2 | U300-A2 |
| Phase 3, day 15-25 | U400-A3 | U400-A3 |
| Phase 4, day 25-36 | U500-A4 | U500-A4 |

[a]Letters denote ration ID's. U300: Ultra Care 300, U400: Ultra Care 400 and U500: Ultra Care 500

The UltraCare™200 program (U200), UltraCare™300 program (U300), UltraCare™400 program (U400) and the UltraCare™500 program (U500) are pelleted diets that are commercially available from Land O'Lakes-Purina Feed, St. Paul, Minn. The control/pelleted Phase 1 diet is similar to the U200 program. Composition of soft moist extruded diet is shown in Table 4.

The dry ingredients were blended in a Hobart mixer to form a relatively homogeneous mixture and then ground with a Hammermill grinder. The ground mixture was fed to the extruder. A die with a 5/32 inch orifice was used. An 8 head barrel was used with 4 holes and 3 knife blades. During extrusion, the conditioned meal was at about 80° F. The extruder RPM was about 506 and extruder amps were 24. The feeder setting was at 25%.

All pigs received common diets during day 8 to 15 (U300), day 15 to 25 (U400), and day 25 to 36 postweaning (U500). Feed and water was offered ad libitum.

Pigs were housed in a conventional nursery facility in pens with a nipple drinker, four-hole feeder, and plastic flooring. For the first week of the trial, the nursery was maintained at 85° F. and decreased 3° F. per week. Pig body weight and feed intake were determined at day 0, 5, 8, 15, 25, and 36 postweaning to evaluate average daily gain (ADG), average daily feed intake (ADFI), and feed:gain ratio.

Data was analyzed by ANOVA as a randomized complete block design using the GLM procedures of SAS. The pen of pigs served as the experimental unit for all data.

Pigs fed the soft moist extruded feed grew faster ($P<0.05$) and consumed more feed ($P<0.05$) than pigs fed the control diet during day 0 to 5 and day 0 to 8 postweaning. (Table 5). Average daily gain (ADG) of pigs receiving the soft moist extruded feed was improved by 50% and 30% compared to those receiving the pelleted control diet during day 0 to 5 and day 0 to 8 postweaning, respectively. Similarly, pigs receiving soft moist extruded feed had 38% and 24% greater average daily feed intakes (ADFI) than those fed the control diet during day 0 to 5 and day 0 to 8 postweaning, respectively.

During day 8 to 15 when all pigs received a common diet, pigs previously fed the soft moist extruded feed continued to have greater ($P<0.10$) ADG and ADFI than pigs fed the control diet. During the overall experiment, no significant ($P>0.1$) differences were observed in ADG or ADFI between treatment groups. However, pigs fed the soft moist extruded feed were 0.8 lb heavier at the end of the nursery period (day 36) than pigs receiving the control diet.

The results of this study indicate that feeding a soft moist extruded feed improves average daily gain and average daily feed intake of nursery pigs.

TABLE 4

| Corn/Oatmeal | 26.18 |
|---|---|
| Vegetable protein | 14.138 |
| Milk-based components (such as whey, lactose) | 21.94 |
| Animal protein | 8.80 |
| Fat | 0.995 |
| Minerals and vitamins | 2.350 |
| Crystalline amino acids | 0.491 |
| Citric acid | 3.000 |
| K Sorbate | 0.500 |
| Calcium propionate | 1.000 |
| Antibiotics | 0.50 |
| Others (such as phytogenic additives) | 0.106 |
| Water | 20.00 |
| Total | 100.00 |

TABLE 5

Effect of feeding a Soft Moist Extruded Phase 1 diet on performance of nursery pigs[a]

| | Treatment (TRT) | | | | |
|---|---|---|---|---|---|
| | TRT 1<br>Control<br>Pelleted | TRT 2<br>Soft Moist<br>Extruded | SEM | TRT<br>$P > F$ if $< 0.2$ | %<br>Improvements<br>over control |
| | ADG, lb | | | | |
| Day 0-5 | 0.307[b] | 0.461[c] | 0.03 | 0.02 | 50 |
| Day 5-8 | 0.491 | 0.538 | 0.04 | 0.16 | 30 |
| Day 0-8 | 0.376[b] | 0.490[c] | 0.03 | 0.03 | 10.8 |
| Day 8-15 | 0.929[d] | 1.029[e] | 0.02 | 0.06 | |
| Day 15-25 | 1.06 | 1.05 | 0.04 | — | |
| Day 25-36 | 1.58 | 1.55 | 0.05 | — | |
| Day 0-36 | 1.05 | 1.07 | 0.02 | — | |
| | ADFI, lb | | | | |
| Day 0-5 | 0.301[b] | 0.415[c] | 0.01 | 0.01 | 37.9 |
| Day 5-8 | 0.617 | 0.696 | 0.03 | 0.11 | |
| Day 0-8 | 0.420[b] | 0.520[c] | 0.02 | 0.03 | 23.8 |
| Day 8-15 | 0.909[b] | 1.049[c] | 0.02 | 0.01 | 15.4 |
| Day 15-25 | 1.42 | 1.44 | 0.04 | — | |
| Day 25-36 | 2.03 | 2.04 | 0.06 | — | |
| Day 0-36 | 1.29 | 1.34 | 0.03 | — | |

TABLE 5-continued

Effect of feeding a Soft Moist Extruded Phase 1 diet on performance of nursery pigs[a]

| | Treatment (TRT) | | | | |
|---|---|---|---|---|---|
| | TRT 1 Control Pelleted | TRT 2 Soft Moist Extruded | SEM | TRT P > F if < 0.2 | % Improvements over control |
| Feed:gain | | | | | |
| Day 0-5 | 0.995 | 0.924 | 0.04 | — | |
| Day 5-8 | 1.32 | 1.35 | 0.21 | — | |
| Day 0-8 | 1.12[d] | 1.08[e] | 0.04 | 0.06 | |
| Day 8-15 | 0.982 | 1.023 | 0.02 | — | |
| Day 15-25 | 1.34 | 1.38 | 0.03 | — | |
| Day 25-36 | 1.29 | 1.32 | 0.01 | — | |
| Day 0-36 | 1.22 | 1.25 | 0.01 | — | |
| Pig WT, lb | | | | | |
| Initial | 12.96 | 12.97 | 0.01 | — | |
| Day 5 | 14.50[b] | 15.27[c] | 0.16 | 0.02 | |
| Day 8 | 16.0[b] | 16.9[c] | 0.24 | 0.03 | |
| Day 15 | 22.5[b] | 24.1[c] | 0.36 | 0.03 | |
| Day 25 | 33.2 | 34.6 | 0.61 | — | |
| Day 36 | 50.8 | 51.6 | 0.95 | — | |

[a]Values are means of 12 pens of five pigs each
[bc]Means in the same row with different superscript differ (P < 0.05)
[de]Means in the same row with different superscript differ (P < 0.1)

Example 2

Effect of Feed Size on the Consumption of Soft Moist Feed

One hundred fourteen weanling pigs (Monsanto EBX x Gene Packer® 35) averaging 12.9 lb bodyweight (BW) were used in a 34-day growth trial to evaluate the effect of feeding a ⅛" and a 3/32" soft moist extruded feed on performance of nursery pigs. At weaning, pigs were sorted by weight and divided into nine weight groups (blocks) of twelve or fifteen pigs per weight group. Pigs within each weight block were allotted into three equal subgroups (pens) of four or five pigs per pen (9 pens/treatment). Dietary treatments were randomly assigned to pens (subgroups) within each of the weight groups (blocks). Dietary treatments used are as shown in Table 6.

TABLE 6

Ration Use[a]

| | 1 Control/ pelleted Sugar coated | 2 Extruded (⅛"-large) | 3 Extruded (3/32"-small) |
|---|---|---|---|
| Phase 1, d 0-5 (11/17-11/21) | A1 | C1 | D1 |
| Phase 1, d 5-8 (11/21-11/25) | A1 | C1 | D1 |
| Phase 2, d 8-15 (11/25-12/02) | U300-A2 | U300-A2 | U300-A2 |
| Phase 3, d 15-25 (12/02-12/12) | U400-A3 | U400-A3 | U400-A3 |
| Phase 4, d 25-34 (12/12-12/21) | U500-A4 | U500-A4 | U500-A4 |

[a]Letters denote ration ID's. U300: Ultra Care 300, U400: Ultra Care 400 and U500: Ultra Care 500

Pelleted control Phase 1 diet (day 0 to 8 postweaning) was similar to the U200 program described in Example 1. U300, U400, and U500 were obtained as described in Example 1. Feed and water was offered ad libitum.

Pigs were housed in a conventional nursery facility in pens with a nipple drinker, four-hole feeder, and plastic flooring. For the first week of the trial, the nursery was maintained at 85° F. and decreased 3° F. per week. Pig body weight and feed intake (dry feed) were determined at day 0, 5, 8, 15, 25, and 34 postweaning to evaluate ADG, ADFI, and feed:gain ratio.

Data was analyzed by ANOVA as a randomized complete block design using the GLM procedures of SAS. The pen of pigs served as the experimental unit for all data.

During day 0 to 5 postweaning, pigs receiving soft moist extruded feed consumed more feed (P<0.01) and tended to have greater (P=0.15) ADG than pigs receiving the control pelleted diet. (See Table 7) Similarly, during day 0 to 8 postweaning, pigs fed the small soft moist extruded feed tended to have greater ADG and ADFI than pigs fed the pelleted or large soft moist extruded feed.

During day 8 to day 15 postweaning when all pigs received a common diet, pigs previously fed the soft moist extruded feeds continued to have greater (P<0.01) ADG and ADFI than pigs fed the control pelleted diet.

During the overall experiment, no significant (P>01) differences were observed in ADG or ADFI among treatment groups. At the end of the nursery period (day 34 postweaning), however, pigs fed the large and small soft moist extruded feed were 0.8 and 1.5 lb heavier, respectively than pigs fed the control pelleted diet.

The results of this study indicated that feeding a soft moist extruded feed improves performance of nursery pig. Pigs receiving the small (3/32") soft moist extruded feed had numerically greater (not statistically significant) ADG and ADFI than those fed the large (⅛") extruded feed.

TABLE 7

| | TRT 1 PC Sugar coated | TRT 2 Extruded Large (⅛") | TRT 3 Extruded Small (3/32") | SEM | TRT P > F if < 0.2 |
|---|---|---|---|---|---|
| ADG, lb | | | | | |
| Day 0-5 | 0.326 | 0.369 | 0.426 | 0.04 | 0.15 |
| Day 0-8 | 0.511 | 0.502 | 0.563 | 0.03 | — |
| Day 8-15 | 0.647[b] | 0.799[c] | 0.839[c] | 0.031 | 0.01 |
| Day 15-25 | 1.45 | 1.46 | 1.42 | 0.038 | — |
| Day 25-34 | 1.48 | 1.49 | 1.50 | 0.03 | — |
| Day 0-34 | 1.08 | 1.10 | 1.12 | 0.02 | — |
| ADFI, lb | | | | | |
| Day 0-5 | 0.327[b] | 0.386[c] | 0.416[c] | 0.01 | 0.01 |
| Day 0-8 | 0.503 | 0.494 | 0.555 | 0.02 | 0.12 |
| Day 8-15 | 0.790[b] | 0.899[c] | 0.967[c] | 0.03 | 0.01 |
| Day 15-25 | 1.59 | 1.66 | 1.68 | 0.04 | — |
| Day 25-34 | 2.03 | 2.04 | 2.05 | 0.05 | — |
| Day 0-34 | 1.29 | 1.33 | 1.36 | 0.03 | — |
| Feed:gain | | | | | |
| Day 0-5 | 0.99 | 1.06 | 1.08 | 0.07 | — |
| Day 0-8 | 0.989 | 1.009 | 0.999 | 0.04 | — |
| Day 8-15 | 1.24 | 1.12 | 1.16 | 0.04 | — |
| Day 15-25 | 1.10[b] | 1.14[bc] | 1.18[c] | 0.01 | 0.01 |
| Day 25-34 | 1.37 | 1.38 | 1.36 | 0.01 | — |
| Day 0-34 | 1.19 | 1.20 | 1.21 | 0.01 | — |
| Pig WT, lb | | | | | |
| Initial | 12.89 | 12.89 | 12.88 | 0.022 | — |
| Day 5 | 14.52 | 14.73 | 15.01 | 0.217 | 0.16 |
| Day 8 | 17.0 | 16.9 | 17.4 | 0.303 | — |
| Day 15 | 21.7[b] | 22.5[c] | 23.3[c] | 0.362 | 0.03 |
| Day 25 | 36.2 | 37.1 | 37.5 | 0.597 | — |
| Day 34 | 49.6 | 50.4 | 51.1 | 0.77 | — |

[bc]Means in the same row with different superscript differ (P < 0.05)

Although the present invention has been described with reference to preferred embodiments, workers skilled in the art will recognize that changes may be made in form and detail without departing from the spirit and scope of the invention.

What is claimed is:

1. An extruded animal feed composition comprising a mixture of starch, protein and one or more preservatives, the animal feed forming a pliable nugget including a moisture content of greater than 12 percent and up to about 20 percent and between about 0.25 weight percent and about 8 weight percent of the one or more preservatives, wherein the pliable nugget is free of a sugar coating.

2. The composition of claim 1 wherein the animal feed is shelf-stable.

3. The composition of claim 1 wherein the animal feed is shelf-stable for at least 3 months.

4. The composition of claim 1 wherein the preservative is selected from the group consisting of citric acid, potassium sorbate, fumaric acid and propionic acid.

5. The composition of claim 1 wherein the preservative is between about 2 percent by weight and about 5 percent by weight.

6. A method of making an animal feed composition comprising:
   preparing a blend comprising starch, protein and at least about 0.25 percent by weight preservatives;
   forming a pliable animal feed nugget by extruding the blend through a restricted orifice; and
   drying the pliable nugget wherein the moisture content of the pliable nugget is greater than 12 percent and up to about 20 percent by weight, wherein the pliable nugget is free of a sugar coating.

7. The method of claim 6 wherein the preservatives are between about 0.25 percent by weight and about 8.0 percent by weight.

8. The method of claim 6 wherein the preservative is selected from the group consisting of citric acid, potassium sorbate, fumaric acid and propionic acid.

9. The method of claim 6 wherein the restricted orifice produces a nugget of at least about 1/16 inches.

10. The method of claim 6 wherein the restricted orifice produces a nugget between about 3/32 inch and about 1/4 inch.

11. A method of feeding a young animal at an onset of weaning comprising providing a young animal extruded animal feed, wherein the animal feed comprises a mixture of starch, protein and preservatives in a pliable nugget, the pliable nugget including between about 0.25 percent by weight and about 8.0 percent by weight of the preservatives and greater than 12.0 percent by weight and up to about 20 percent by weight moisture,
   wherein the pliable nugget is free of a sugar coating,
   wherein the pliable nugget is provided at the onset of weaning, and wherein the pliable nugget is effective to at least one of increase average daily weight gain of the young animal or increase average daily feed intake of the young animal.

12. The method of claim 11 wherein the animal is a mammal.

13. The method of claim 11 wherein the animal is a ruminant.

14. The method of claim 11 wherein the animal is a pig.

15. The method of claim 14 wherein the pig is a weanling pig that is at least about 10 pounds when the feed is provided.

16. The method of claim 11 wherein the animal is a horse.

17. The method of claim 11 wherein the animal is provided the animal feed for a period of between about 5-8 days after the onset of weaning.

18. The method of claim 11 wherein the animal is provided the animal feed for a period of at least 14 days after the onset of weaning.

19. A method of weaning a mammal comprising feeding the young animal extruded animal feed, the feed comprising a mixture of starch, protein and preservatives in a pliable nugget, the pliable nugget including between about 0.25 percent by weight and about 8 percent by weight of the preservatives and at least 12 percent by weight and up to about 20 percent by weight moisture,
   wherein the pliable nugget is free of a sugar coating, and
   wherein the pliable nugget is effective to at least one of increase average daily weight gain of the young animal or increase average daily feed intake of the young animal.

20. The method of claim 19 wherein the mammal is a weanling pig.

21. The method of claim 20 wherein the extruded animal feed is provided at the onset of weaning.

22. The method of claim 19 wherein the extruded animal feed is administered for between about 5-8 days.

23. The method of claim 19 wherein the extruded animal feed is administered for at least 14 days.

24. The method of claim 6, wherein the preservative is an edible acid.

* * * * *

UNITED STATES PATENT AND TRADEMARK OFFICE
CERTIFICATE OF CORRECTION

PATENT NO. : 9,066,532 B2
APPLICATION NO. : 12/273759
DATED : June 30, 2015
INVENTOR(S) : Kent J. Lanter et al.

It is certified that error appears in the above-identified patent and that said Letters Patent is hereby corrected as shown below:

SPECIFICATION

| Column | Line | | Should Be |
|---|---|---|---|
| 8 | 18 | "experiment, no significant (P>01)" | -- experiment, no significant (P>0.1) -- |

CLAIMS

| Column | Line | Claim | | Should Be |
|---|---|---|---|---|
| 10 | 37 | 21 | "The method of claim 20" | -- The method of claim 19 -- |

Signed and Sealed this
Twenty-fourth Day of November, 2015

Michelle K. Lee
*Director of the United States Patent and Trademark Office*